US008065078B2

(12) United States Patent
Tashev et al.

(10) Patent No.: US 8,065,078 B2
(45) Date of Patent: Nov. 22, 2011

(54) CONVEYING LOCATIONS IN SPOKEN DIALOG SYSTEMS

(75) Inventors: Ivan Tashev, Kirkland, WA (US); Michael Lewis Seltzer, Seattle, WA (US); Yun-Cheng Ju, Bellevue, WA (US); Alex Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 11/836,955

(22) Filed: Aug. 10, 2007

(65) Prior Publication Data

US 2009/0043497 A1    Feb. 12, 2009

(51) Int. Cl.
   *G01C 21/00*   (2006.01)
   *G08G 1/123*   (2006.01)
(52) U.S. Cl. .................... 701/201; 701/205; 340/988
(58) Field of Classification Search .................. 701/201, 701/205, 209, 211; 340/988
   See application file for complete search history.

(56) References Cited

U.S. PATENT DOCUMENTS

| | | | |
|---|---|---|---|
| 5,625,668 | A | 4/1997 | Loomis et al. |
| 6,038,559 | A * | 3/2000 | Ashby et al. ........................ 1/1 |
| 6,184,823 | B1 * | 2/2001 | Smith et al. ............... 342/357.31 |
| 6,473,692 | B2 | 10/2002 | Hancock et al. |
| 6,542,814 | B2 | 4/2003 | Polidi et al. |
| 7,116,985 | B2 | 10/2006 | Wilson et al. |
| 2004/0158399 | A1 * | 8/2004 | Kato .............................. 701/209 |
| 2004/0205517 | A1 * | 10/2004 | Lampert et al. ............... 715/502 |
| 2005/0177311 | A1 | 8/2005 | Thorne et al. |
| 2006/0184323 | A1 | 8/2006 | Park |
| 2006/0259237 | A1 * | 11/2006 | de Silva et al. ............... 701/209 |
| 2007/0016368 | A1 * | 1/2007 | Chapin et al. ................. 701/211 |
| 2007/0050128 | A1 | 3/2007 | Lee et al. |
| 2007/0106459 | A1 * | 5/2007 | Nakayama et al. ........... 701/201 |
| 2007/0233817 | A1 * | 10/2007 | Johnson et al. ............... 709/219 |
| 2008/0077319 | A1 * | 3/2008 | Kato et al. ..................... 701/208 |
| 2008/0097698 | A1 * | 4/2008 | Arnold-Huyser et al. ..... 701/300 |
| 2008/0234929 | A1 * | 9/2008 | Watson et al. ................ 701/207 |

FOREIGN PATENT DOCUMENTS

| | | | |
|---|---|---|---|
| KR | 20050032876 A | | 4/2005 |
| KR | 20060114943 A | | 11/2006 |
| WO | 2005002089 A1 | | 1/2005 |
| WO | 2005013234 A1 | | 2/2005 |

OTHER PUBLICATIONS

"International Search Report", Filed Date Aug. 8, 2008, Application No. PCT/US2008/072620, pp. 1-10.
"Alpine DVD Vehicle Navigation System—NVEN872", retrieved at <<http://www.abtelectronics.com/product/21494.html>> Abt Electronics. Inc, 1997-2007, pp. 1-4.

(Continued)

*Primary Examiner* — James P Trammell
*Assistant Examiner* — Muhammad Shafi (57) ABSTRACT

The presentation of location information to a user that is distracted by traveling can result in the user quickly forgetting, or never even comprehending, key parts of the location information, such as the street number. Identification can be made of intersections and points of interest near the user's destination, which can then be provided instead of, or in addition to, the address, thereby increasing user comprehension and retention, especially when distracted. Map data can be parsed into addresses, intersections and points of interest databases. These databases can be accessed to identify proximate intersections and points of interest, which can then be filtered and subsequently ranked to identify one intersection, one point of interest, or both, that can be presented to the user to aid the user in comprehending and retaining the location information even when distracted.

16 Claims, 6 Drawing Sheets

OTHER PUBLICATIONS

"Cityneo POI finder and content integration", retrieved at <<http://www.cityneo.com/poi_finder.htm>> Cityneo, 2005, p. 1.

"TomTom Navigator 6—Software & Maps of Western Europe on memory card + GPS receiver", retrieved at <<http://www.tomtom.com/products/product.php?ID=280&Category=2&Lid=1>> TomTom International BV, 2007, pp. 1-5.

Berger et al. "A Maximum Entropy Approach to Natural Language Processing", vol. 22, Issue 1, MIT Press, 1996, pp. 34.

Tsimhoni, "Address Entry While Driving: Speech Recognition Versus a Touch-Screen Keyboard", vol. 46, No. 4 Human Factors, Dec. 22, 2004, pp. 600-610.

Venkataraman et al., "An Architecture for Rapid Retrieval of Structured Information Using Speech With Application to Spoken Address Recognition", IEEE Press, Nov. 30-Dec. 3, 2003, pp. 459-464.

Kuo et al., "Discriminative Training for Call Classification and Routing", 7th International Conference on Spoken Language Processing, Sep. 16-20, 2002, p. 1.

"Interspeech 2007 Session FrC.P1a: Spoken Language Understanding and Summarization", retrieved at <<http://www.interspeech2007.org/Technical/detail.php?ses=FrC.P1a>>, Aug. 31, 2007, pp. 2.

Carpenter et al., "Natural Language Call Routing: A Robust Self-Organizing Approach", 1998, pp. 4.

Yu et al., "N-Gram Based Filler Model for Robust Grammar Authoring", vol. 1, IEEE Press, May 14-19, 2006, pp. 565-568.

Gruenstein et al., "Scalable and Portable Web-Based Multimodal Dialogue Interaction with Geographical Databases", Proceedings of Interspeech2006, Sep. 2006, pp. 4.

\* cited by examiner

CONVEYING LOCATIONS IN SPOKEN DIALOG SYSTEMS

BACKGROUND

Digital maps remotely accessed via a computing device over a network offer several significant advantages over paper-based maps. Such digital maps can include details that would overwhelm a paper-based map because the level of detail that is displayed by a digital map can be adjusted by the user, such as through a zoom function. Digital maps can likewise be updated much more frequently than paper maps. As a result, the provision of digital map data over a network, such as the ubiquitous World Wide Web (WWW), has grown substantially.

Conventional map data provided over the WWW is directed to aiding users identify routes, distances, and locales while at interacting with networked computing devices and before traveling. Thus, the provision of map data over the WWW generally includes printing abilities to enable users to take specific map-based information with them when they travel. Once a user is traveling, however, accessing remote map data can be difficult and inconvenient. As an initial matter, many geographic areas do not have wireless network access through which to obtain digital map data. In addition, even if the user could obtain access to digital map data while traveling, conventional interfaces require direct attention and manipulation, which the user often cannot provide, such as when the user is driving a car.

Consequently, a range of products has become available that offer digital map data to users while they are traveling. Such products traditionally comprise a limited display area and a limited input interface so that the user can interact with the product while performing some other task, such as driving. Such products also often incorporate Global Positioning Service (GPS) sensors that track the user's location and then provide information based on the user's location, such as nearby restaurants or directions from the user's current location to a place of interest. The presentation of such information, however, is still done in a manner that is difficult for distracted users to process. In particular, many traveling activities, such as driving, require the user's visual focus and mental attention. Presenting locations to a user in the traditional format of a street number, followed by a street name, can require more concentration that the user can afford to spare at any one time, and can be difficult for the user to remember for more than a very short period of time.

SUMMARY

Empirical evidence suggests that distracted users can more easily process and recall location information when presented in the form of an intersection or a proximity to a point of interest that may be known to the user. In addition, rather than requiring the user to shift their visual focus away from their current activity, such as driving, the intersection and point of interest information can be provided to the user in an aural manner. Consequently, the computing hardware and computer-executable instructions need not be co-located with the user, but can instead be accessed over a wireless voice-based device, such as the ubiquitous cellular telephone.

In one embodiment, digital map data is parsed into three databases. A first database can comprise address information obtained from the digital map data, and can correlate addresses with their location expressed in terms of latitude and longitude, or other coordinate system. A second database can comprise intersection information obtained from the digital map data and can comprise two tables: a first table specifying intersections as a combination of two or more street identifiers and correlate them with their locations expressed in a coordinate system consistent with that used in the first database, and a second table correlating street identifiers to the streets' common names. A third database can comprise point of interest information obtained from the digital map data, and can correlate points of interest with their location expressed in a coordinate system consistent with that used in the first database. In another embodiment, the third database can further comprise point of interest information entered by one or more users, enabling users to specify the points of interest with which they are most familiar.

An address of interest to the user can be determined, either by the user themselves, such as by specifying a destination address which the user is trying to reach, or by requesting the location of a business whose services are relevant to the user, such as a hotel at which the user has reservations. Once the address is known, the location of such an address in a common coordinate system can be obtained from the first database. Using the obtained location information, one or more nearby intersections can be identified with reference to the second database, and one or more nearby points of interest can be identified with reference to the third database. The identified intersections and points of interest can be filtered to remove intersections and points of interest that would not be helpful in guiding the user. The remaining intersections and points of interest can be ranked according to predetermined criteria and a highest ranked intersection and point of interest can be selected.

In one embodiment, the presentation of location information to the user can reference the highest ranked intersection and the highest ranked point of interest. In an alternative embodiment, if only a highest ranked intersection can be determined, then the location information can be presented to the user with reference to the highest ranked intersection. In a further embodiment, if only a highest ranked point of interest can be determined, then the location information can be presented to the user with reference to both the highest ranked point of interest and the address of interest. Before presenting the location information to the user, the information can first be normalized to be more meaningful to the user, including the avoidance of repetitious information, and the presentation of street names, point of interest names, and address numbers in a colloquial manner that would be most familiar to the user. In presenting the information to the user in this manner, and with reference to intersections and points of interest, the user's comprehension and retention of the location information can be improved.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to providing location information to a user in a context that the user can process and recall despite being distracted by activities, such as driving. In one embodiment, location information is provided to the user by referencing a nearby intersection, a nearby point of interest, or both. Location information can optionally include provision of the address of the location itself, such as in combination with a nearby point of interest. Such presentation, focusing on street names and the names of points of interest, can be easier for a distracted user to process and recall, than a street number, especially one with four or more digits.

The techniques described herein focus on the filtering and ranking of intersections and points of interest as related to an address relevant to a user. In one embodiment, map data can be mined to create three databases: (1) an address database correlating addresses to coordinate locations, such as latitude and longitude values, (2) an intersections database correlating intersections to coordinate locations, and (3) a points of interest database correlating points of interest to coordinate locations. Location information for a particular address can be provided to the user by initially filtering the intersections and points of interest to identify those that are sufficiently close to the particular address. Subsequently, close intersections and points of interest can be further filtered based on usefulness, including usefulness for the particular user. Remaining intersections and points of interest can then be ranked to enable identification of a highest ranked intersection and a highest ranked point of interest. After normalizing them for presentation to the user, the location information can be provided to the user with reference to one or more of the normalized highest ranked intersection and the normalized highest ranked point of interest.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
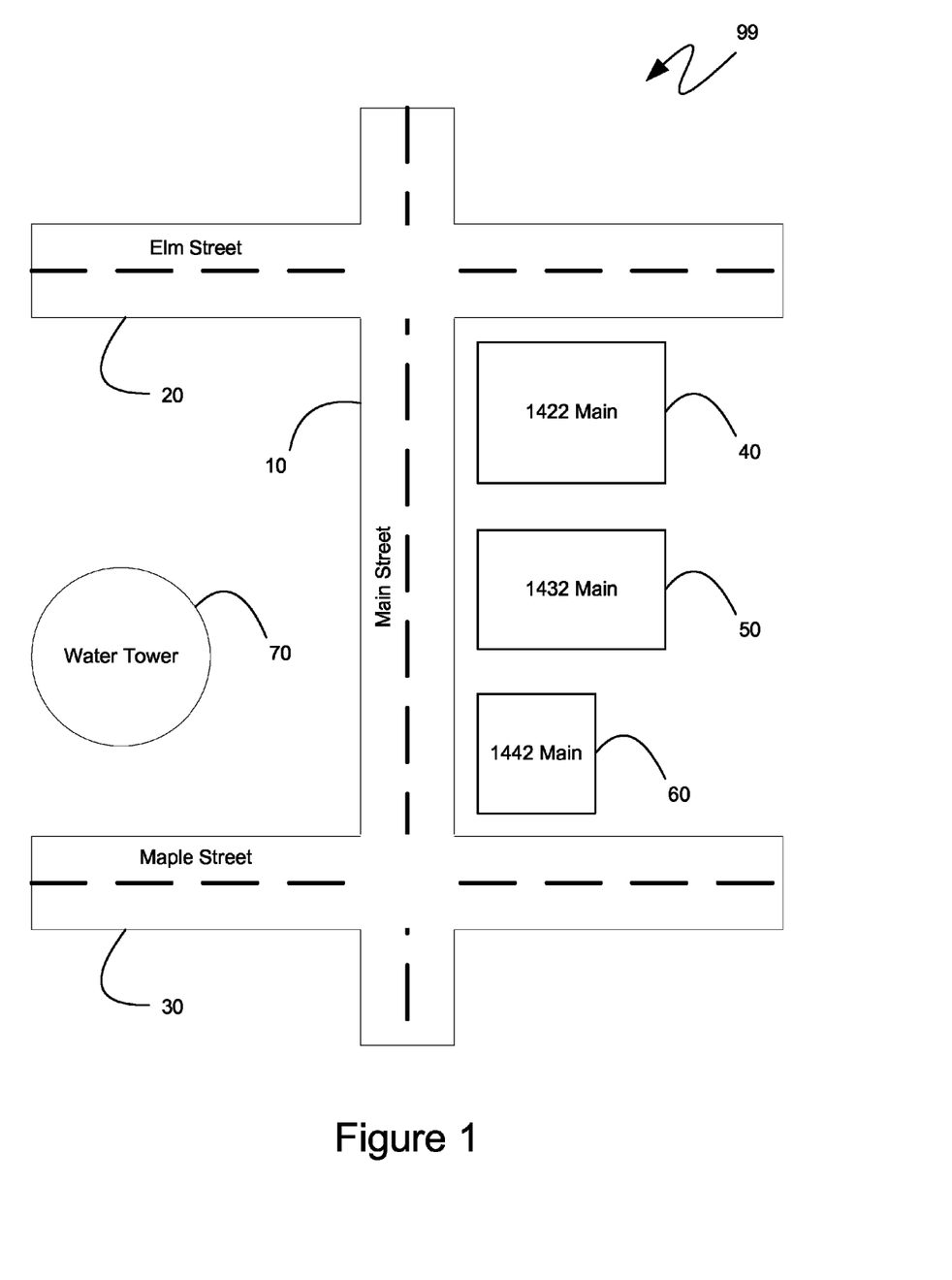
FIG. 1 is an illustrative map.

With reference to FIG. 1, an exemplary map 99 is illustrated, providing context for the descriptions below. The exemplary map 99 comprises streets 10, 20 and 30, nominated Main Street, Elm Street and Maple Street, respectively. The exemplary map 99 further comprises three buildings along Main Street 40, 50 and 60, bearing the street numbers 1422, 1432 and 1442, respectively. The exemplary map 99 also comprises a water tower 70.

A user driving within a locale partially illustrated by the exemplary map 99 may seek to visit a nearby gas station. Traditional digital map devices designed for traveling users can identify a gas station at 1422 Main Street and can communicate that information to the user by announcing the address as: "fourteen-twenty-two main street." If the user is distracted by driving, however, they may not remember the full address. For example, the user may have only remembered "something-two main street." In the context of the exemplary map 99, such information would not be useful, as every address on Main Street ends in a "2". Such a user recollection problem can be exacerbated by the street name itself. For example, if the address was on "North Knickerbocker Parkway," it is likely that a distracted user has already forgotten the street number by the time the traditional digital map device completed voicing the words "north knickerbockers parkway."

Within the context of the exemplary map 99, it would likely be easier for a distracted user to be informed of the gas station at 1422 Main Street by informing the user that the gas station is on the corner of Elm Street and Main Street. By voicing the location as being "on the corner of elm and main," the user is required only two remember two words: "elm" and "main" and the user's memory is not distracted with a series of numbers that can be difficult to recall. Points of interest to the user can likewise be referenced to aid processing and recollection. For example, the location of the gas station at 1422 Main Street can be provided to the user by voicing it as being "on the corner of elm and main, near the water tower." Such additional information can provide the user with a useful reference that the user may already know the location, or approximate location, of, and can also enable the specification of a particular side of the street.

Before proceeding to a detailed description of the determination of relevant intersections or points of interest, reference is made to an exemplary computing device that can, either by itself or in combination with other computing devices, perform the functions described further below. Therefore, turning to FIG. 2, an exemplary computing device 100 is illustrated. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include the Peripheral Component Interconnect (PCI) bus and various higher speed versions thereof, the Industry Standard Architecture (ISA) bus and Enhanced ISA (EISA) bus, the Micro Channel Architecture (MCA) bus, and the Video Electronics Standards Associate (VESA) bus.

Figure 2:
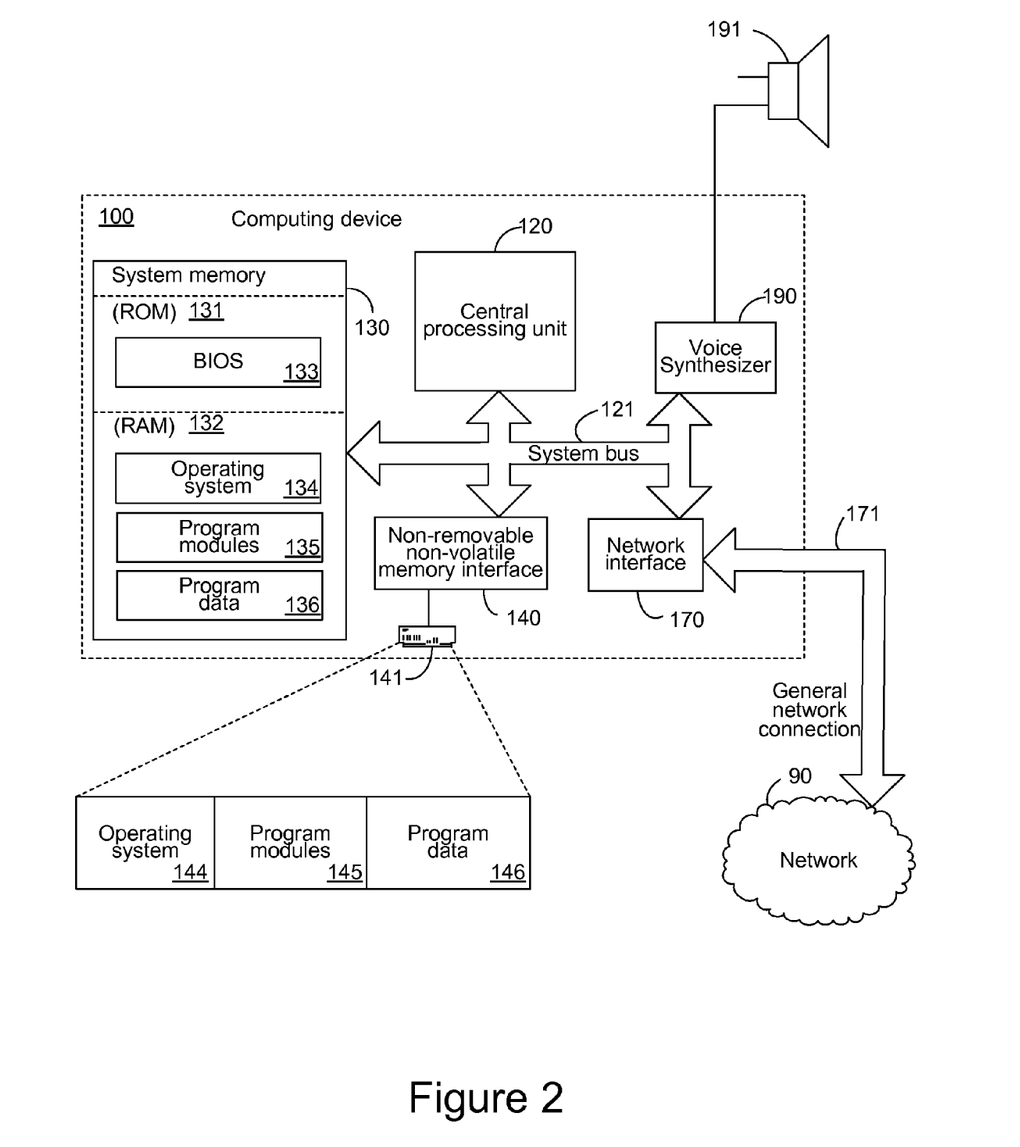
FIG. 2 is a block diagram of an exemplary computing device.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. The logical connection depicted in FIG. 2 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used. For example, the network 90 can refer to nothing more than a landline or cellular telephone network. In such a case the network interface 170 can comprise, or be connected to, a voice control module, whereby the operation of the computing device 100 can be controlled through the network interface 170 by speaking commands into a telephone connected to the network 90.

The computing device 100 further comprises a voice synthesizer 190 connected to a speaker 191. The voice synthesizer 190 can convert digital information into audible speech in conformance with a user's selected language. The speaker 191 need not be co-located with the computing device 100, as shown in FIG. 2, and can, instead, be located remotely, such as part of another device connected to the network 90. For example, the voice synthesizer 190 can provide signals for a spoken response that can be provided to a user over a cellular or landline telephone network 90. In such a case, the speaker 191 can be the speaker of the user's cellular or landline telephone. In addition, the computing device 100 can also comprise a visual feedback device, such as a monitor or simple character display, though, for simplicity, such a visual feedback device is not illustrated in FIG. 2. As with the speaker 191, a visual presentation device need not be co-located with the computing device 100, and can, instead, be located remotely, including as part of another device connected to the network 90. For example, the computing device 100 could provide textual responses to a cellular telephone connected to the cellular network 90 in the form of instant messages or text messages, in which case the visual presentation device would be the screen of the user's cellular telephone.

Figure 3:
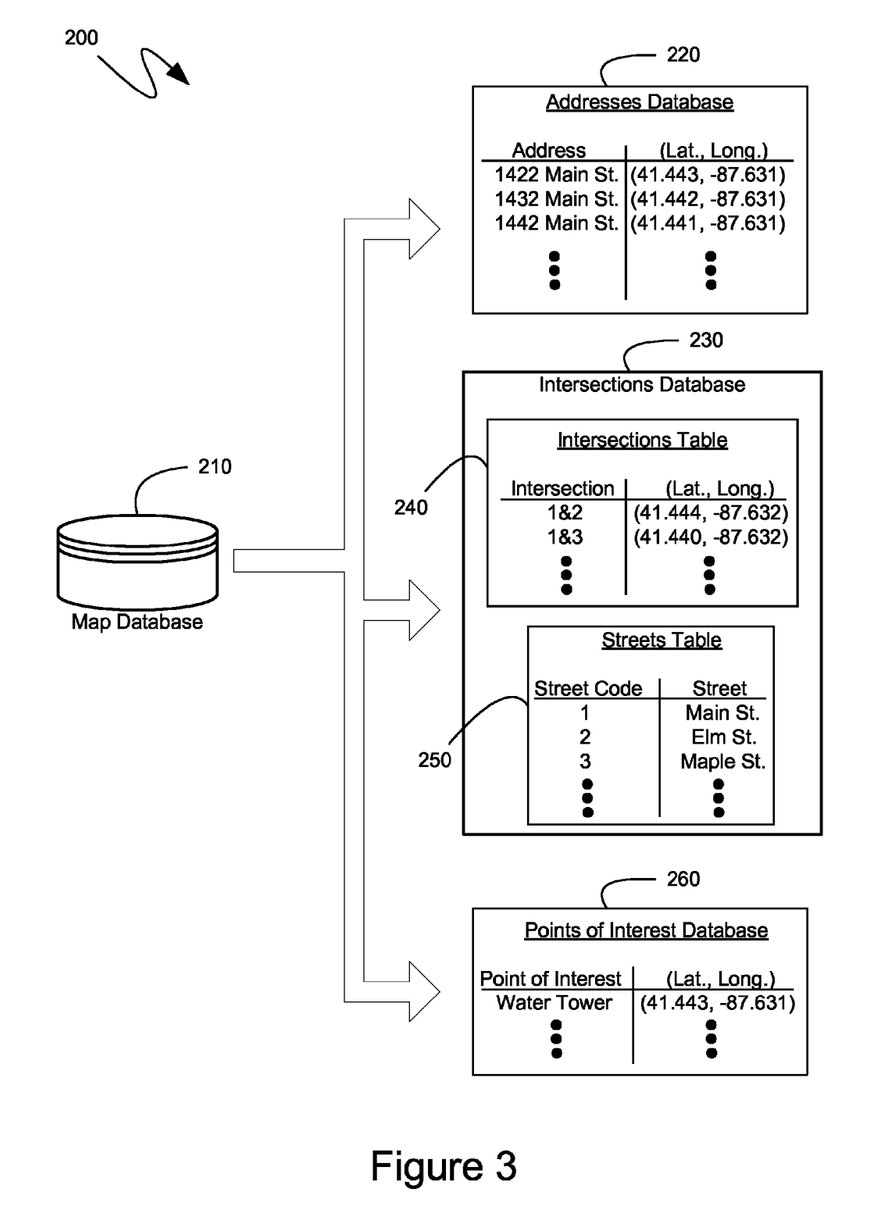
FIG. 3 is an exemplary set of databases.

As indicated, the computing device 100 can operate in a networked environment whereby only some of the below described functions are performed by any one device. For example, one computing device, such as computing device 100, can generate the databases shown in FIG. 3, while one or more other computing devices can perform the steps described in FIGS. 4, 5 and 6. The generation of databases relevant to the presentation of location information to potentially distracted users is shown in FIG. 3. As can be seen, one or more map databases 210 can be parsed to obtain the information populating the addresses database 220, the intersections database 230 and the points of interest database 260.

The map database 210 can be any one or more conventional map databases, including image-based databases. One or more crawler applications can parse the map database 210, extracting information relevant to each of the addresses database 220, intersections database 230 and points of interest database 260. For the addresses database 220, each address in the map database 220 can be extracted and associated with its location in a coordinate system. The addresses database 220 of FIG. 3 shows an association to a coordinate system based on latitude and longitude, but any other coordinate system could equally be used in a consistent manner across databases 220, 230 and 260. In addition, while the addresses of the addresses database 220 are shown in FIG. 3 as comprising only a street number and a street name, the full address could be used, including information regarding the city, state, and full zip code information. Alternatively, the addresses database 220 can be segmented in such a manner that state, city or zip code information can be derived on a per-segment basis, thereby reducing redundancy in the addresses data.

One or more crawler applications can similarly identify intersections in the map database 210 and can extract those intersections and their associated location and store such information in the intersections database 230. In one embodiment, an intersection can be identified from the map database 210 by a crawler application based on the names of the streets, such that any two or more streets with different names meeting in a single point represented an intersection. In an alternative embodiment, an intersection can be identified from image data by identifying two or more intersecting lines.

Once the intersections of the map database 210 have been identified, they can be stored in the intersections database 230. In one embodiment, the intersections database 230 comprises two tables: an intersections table 240 and a streets table 250. The intersections table 240 can comprise intersection location information correlating the location, expressed in a coordinate system, of an intersection, with the intersection, expressed as a combination of two or more intersecting streets. As shown in table 240 of FIG. 3, the coordinate system can be based on latitude and longitude. Alternatively, it be any coordinate system compatible with the coordinate system of the addresses database 220.

To conserve storage space, and decrease the redundant data stored in the intersections database 230, the intersections table 240 can express the intersecting streets of an intersection using a numerical value, such as a hash or other code. Thus, in the example shown in table 240 of FIG. 3, rather than storing the text "Main Street" for each intersection on Main Street, a code value of "1" can simply be used to signify "Main Street." Consequently, a streets table 250 can be used to translate between the codes or values used and the human-readable street name.

In addition to the addresses database 220 and the intersections database 230, a points of interest database 260 can also be generated from the map database 210. In one embodiment, one or more crawler applications can identify points of interest of varying sorts, such as public buildings, famous landmarks, or unique structures, such as radio or water towers. In an alternative embodiment, the points of interest database 260 can comprise, not only information mined from the map database 210, but also user-added information, such as points of interest that may be significant, either for a particular user, or for a class of users. For example, business travelers can specify known corporate locations as points of interest, even though such locations would not likely be helpful in guiding other travelers. Similarly, an individual user can specify their in-law's house as a point of interest since it may be one of the few locations that individual knows the location of, even though such a point of interest may not be helpful to anyone else.

As with the addresses database 220 and the intersections database 230, the points of interest database 260 can correlate points of interest to their location expressed in a coordinate system. The points of interest database 260 shown in FIG. 3 uses the latitude and longitude coordinate system, though any coordinate system compatible with the coordinate system used in databases 220 and 230 can be used.

Figure 4:
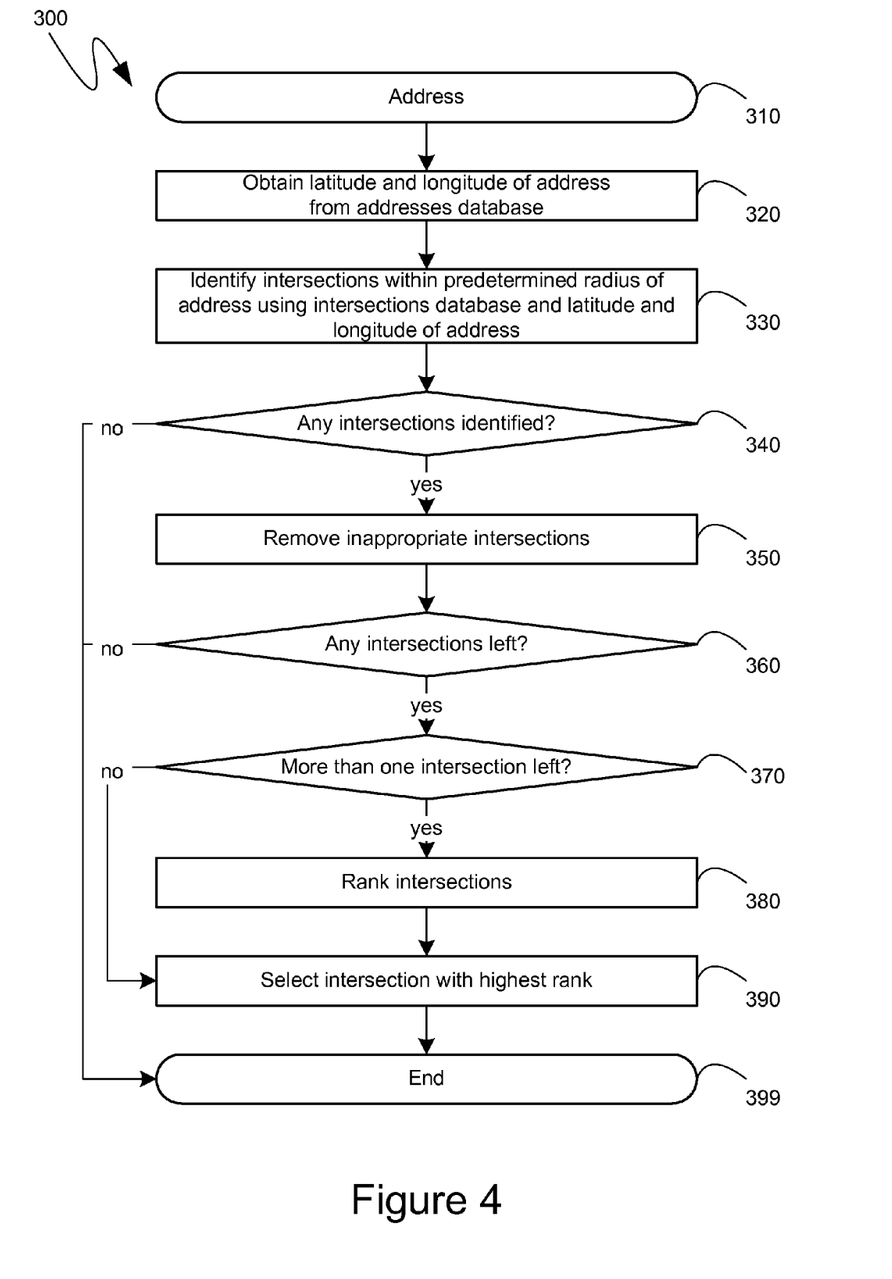
FIG. 4 is flowchart illustrating an exemplary process for identifying an intersection.

Turning to FIG. 4, a flow diagram 300 illustrates an exemplary mechanism by which the addresses database 220 and the intersections database 230 can be used to identify an intersection that can be communicated to the user as part of the communication of a location to the user. Initially, at step 310, an address can be used to identify the location that is to be presented to the user. In one embodiment, the address of step 310 can be provided by external mechanisms, such as a database of available hotels, or a database of gas stations with the cheapest gas prices. Thus, the address of step 310 can be the answer to a question posed by the user, such as a request to find available hotels or inexpensive gas. In an alternative embodiment, the address of step 310 can be provided by the user themselves, such as at an initial time when the user first learned of the address and before they have had a chance to forget it.

Once the address of the location is known, the coordinates, such as the latitude and longitude, of the address can be obtained by reference to the addresses database 220. Such an action is represented by step 320 of FIG. 4. The coordinates obtained at step 320 can then be used, at step 330, to the identify intersections within a predetermined radius of those coordinates. In one embodiment, the predetermined radius can be selected such that the user can be reasonably expected to identify the location when guided to an intersection within a predetermined radius from the location. For example, in an urban setting, a predetermined radius can be a tenth of a mile or less, while in a suburban setting, which can be more spread out, the predetermined radius can be a quarter of a mile or more. In an alternative embodiment, the predetermined radius can be selected based on the digital map data of the map database 110. For example, city blocks can be identified from the digital map data, and the predetermined radius can vary based on the city blocks identified, and can be selected such that it is no more than half a city block.

After the intersections within a predetermined radius from the location are identified at step 330, a check can be made at step 340 to verify that at least one intersection was identified. If no intersections were identified, then the identification of a relevant intersection can simply end at step 399, as shown. However, if any intersections are identified at step 330, then, at step 350, inappropriate intersections can be removed from the listing of intersections identified by step 330. In one embodiment, inappropriate intersections include intersections that do not represent a physical intersection of two or more streets oriented in different directions. For example, a strict mining of the map database 210 might identify, as an intersection, the location where Main Street becomes Highway 123, even though there is no physical intersection at that location, only the continuation of a single road. Such an intersection can be considered an "inappropriate intersection" because it would traditionally not be considered an "intersection" by most users and would likely confuse the user if presented as such. Similarly, the merging of two streets can be defined as an intersection, even though most users would not consider it as such. Thus, such a merge could also be considered an "inappropriate intersection" and be removed at step 350.

In another embodiment, inappropriate intersections can include intersections that do not share a street with the address provided at step 310. Such intersections may not be useful in describing the location of the address to the user, since the address is not easily accessible from the intersection. Thus, step 350 can also ensure that the street on which the address is found is represented as at least one of the streets in the remaining "appropriate" intersections.

At step 360, after inappropriate intersections have been removed, a check can be made to determine whether any intersections remain. If no intersections remain at step 360, then the determination of an intersection with which to reference the location to the user can end at step 399 without having found an appropriate intersection. However, if at least one intersection remains at step 360, then, at step 370, a further check can be made to determine if more than one intersection remains. If only one intersection remains at step 370, then that intersection will be used to inform the user of the location of the address received at step 310, and, thus, that intersection can be selected at step 390. If more than one intersection remains at step 370, the remaining intersections can be ranked at step 380. While steps 360 and 370 are illustrated as individual steps, those of skill in the art will readily recognize that they could be implemented through a single check.

The ranking of intersections at step 380 can be performed with reference to any one or more criteria designed to identify the roads or intersections that are mostly likely to be useful to the user when referenced. If multiple criteria are used, each criteria can be assigned a value according to a weighting scheme and the rank of an intersection can simply be the sum of the values of the criteria assigned to each intersecting road. Alternatively, each road can be ranked individually, and a subsequent ranking of the intersection can be based on a sum of the individual intersecting street rankings, such that the highest ranked intersection can be the one with the lowest sum. In addition, while the flow diagram 300 of FIG. 4 indicates that the intersections are ranked at step 380, much of the ranking information can be precomputed and stored in the intersections database 230, thereby saving downstream processing effort.

In one embodiment, each street of an intersection can be ranked based on the number of other intersections in the intersections database 230 that also comprise that street. The ranking of a street, therefore, can simply be the numerical value of other intersections including that street, with higher values representing appropriately higher rankings. Streets with a large number of intersections are likely to be major streets that travel through an entire metropolitan area, and may, therefore, be more useful to a user in identifying an intersection, as the user may already be familiar with the street.

In an alternative embodiment, each street of an intersection can be ranked based on the number of businesses located on the street. Such information can be obtained from the addresses database 220 in conjunction with a business directory or similar database. The ranking of a street can then simply be the total number of business identified as being located on that street. Streets with a large number of businesses are similarly likely to be major streets that may already be known by the user and, consequently, may be more useful to the user.

The flow diagram 300 is not limited to the type of data that can be used in ranking the intersections at step 380 and contemplates the use of any data that can act as an indicia of those streets that may be more useful to the user in identifying the location of the address received at step 310.

Once the intersections have been ranked at step 380, the highest ranked intersection can be identified at step 390. As will be described further below, the highest ranked intersection selected at step 390 can be presented to the user as part of the presentation of the location of the address received at step 310. Once an intersection has been identified at step 390, the processing of intersections can end at step 399, as shown.

Figure 5:
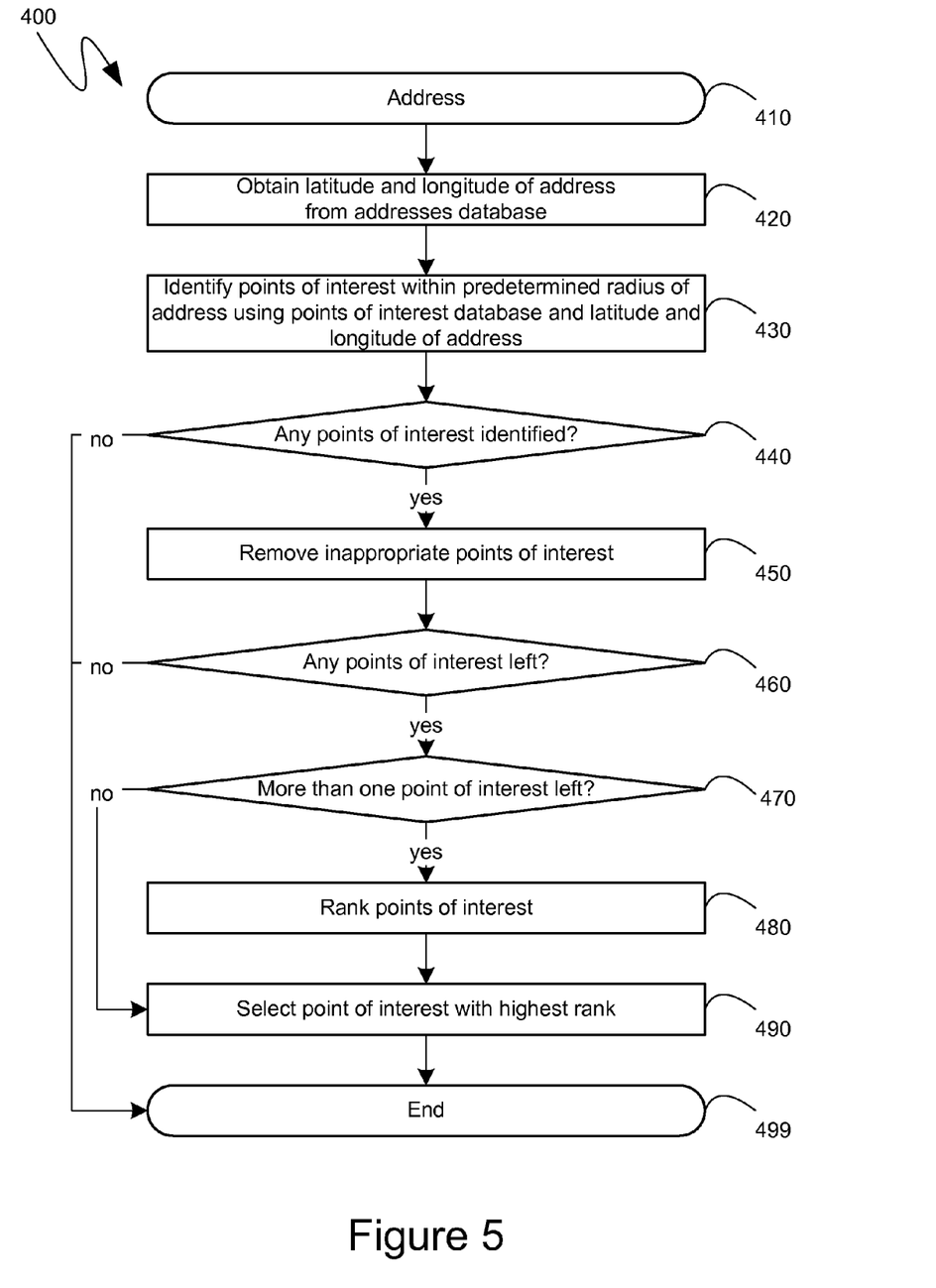
FIG. 5 is flowchart illustrating an exemplary process for identifying a point of interest.

In an analogous manner, flow diagram 400 of FIG. 5 illustrates an exemplary series of steps that can identify a point of interest that can be used to present the location of an address to the user. Flow diagram 400 is illustrated independently of flow diagram 300, thereby signifying that the processing of flow diagrams 300 and 400 can occur in parallel, or in any order, without affecting the overall operation. The address received at the initial step 410 of flow diagram 400 can be the same as the address received at step 310, and can come from the same sources enumerated above. If flow diagram 400 is being performed after, or even in parallel with, flow diagram 300, the determination of the location of the address at step 420 may have already been performed by step 320, as described above. In such a case, step 420 need not comprise anything more than the obtaining of the coordinate information already determined by step 320. In an analogous manner, if flow diagram 400 was performed prior to, or in parallel with, flow diagram 300, step 320 could likewise obtain coordinate information from step 420 if it was already determined by step 420.

After determining coordinate information at step 420, the coordinate information can be used to identify points of interest from the points of interest database 260 that are within a predetermined radius from the identified location. As with the intersections determined at step 320, the radius from the identified location can vary based on a number of factors. For example, the radius can simply be a set distance. Alternatively, the predetermined radius can be based on map data such that, for example, the area within which points of interest can be identified can extend further down the same street as the address, since points of interest on the same street may be more useful to the user than points of interest on adjoining streets.

Once an appropriate area around the identified location is searched for points of interest at step 430, a determination as to whether any points of interest were identified can be made at step 440. If no points of interest were identified, then the processing can end at step 499 without having identified a relevant point of interest. However, if points of interest were identified, then processing can proceed to step 450 where inappropriate points of interest can be filtered away. As with intersections, there may be points of interest that are not likely to be useful in identifying the location of the address to a user and may, actually, further confuse the user. Such points of interest can include, for example, points of interest that are not visible from the address provided at step 410, or points of interest that may be duplicates of already identified points of interest.

Subsequently, at step 460, a check can be made to determine whether any points of interest remain. If no points of interest remain at step 460, then the determination of a point of interest with which to reference the location to the user can end at step 499 without having found an appropriate point of interest. However, if at least one point of interest remains at step 460, then, at step 470, a further check can be made to determine if more than one point of interest remains. If only one point of interest remains at step 470, then that point of interest will be used to inform the user of the location of the address received at step 410, and, thus, that point of interest can be selected at step 490. If more than one point of interest remains at step 470, the remaining points of interest can be ranked at step 480. As with steps 360 and 370, while steps 460 and 470 are illustrated as individual steps, those of skill in the art will recognize that they could be implemented through a single check.

The ranking of the points of interest at step 480 can, like the ranking of the intersections at step 380, be based on any criteria that can serve as indicia of which points of interest are most likely to be useful in identifying the location of the address received at step 410 to the user. For example, the points of interest can be ranked based on their distance from the address, with those points of interest that are closer to the address receiving a higher ranking. Alternatively, the points of interest can be ranked based on the type of point of interest and which type of point of interest is likely more useful to a given user. Thus, for users traveling within their own community, governmental buildings, such as the post office or city hall may receive higher rankings, while for users that are visiting a community for the first time more visible and easily identifiable landmarks, such as water towers, may receive a higher ranking. Again, as with intersections, the ranking of the points of interest need not be based on a single criteria and can, instead, be based on multiple criteria weighted in accordance with their relative importance.

Once the points of interest have been ranked at step 480, a point of interest with the highest ranking can be selected at step 490 for use in presenting the location of the address to the user. Subsequently, processing can end at step 499.

Figure 6:
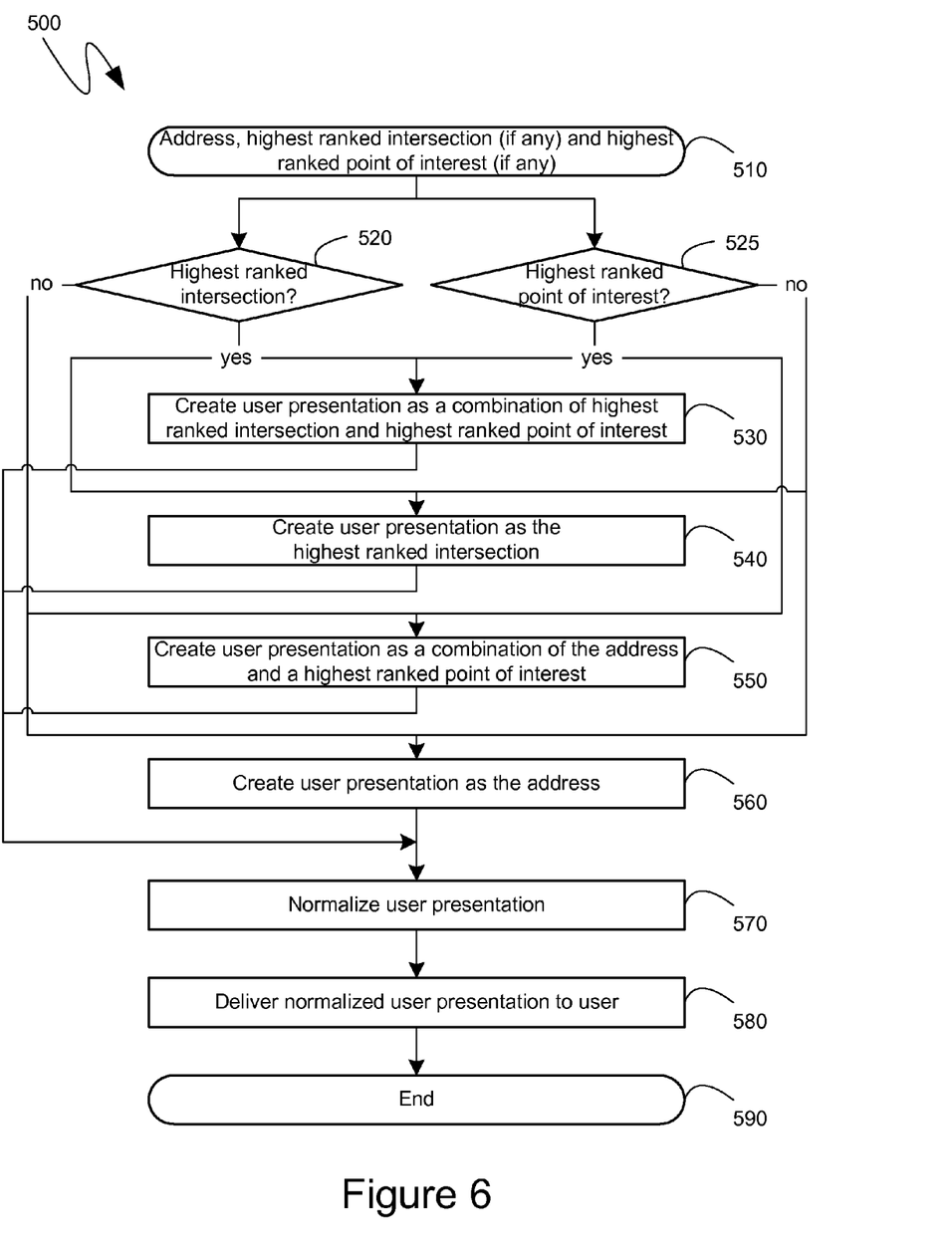
FIG. 6 is a flowchart illustrating an exemplary process for providing location information to a user.

As can be expected, the presentation of the location of the address to the user can depend on whether an intersection and a point of interest have been identified by processes, such as those illustrated with the exemplary flow diagrams 300 and 400 of FIGS. 4 and 5. Turning to FIG. 6, a flow diagram 500 illustrates an exemplary series of steps for providing location information to a user that may be distracted. Initially, at step 510, the address provided at steps 310 and 410 can be input, along with any intersection that may have been identified at step 390 and any point of interest that may have been identified at step 490. Steps 520 and 525 can determine whether a highest ranked intersection was identified and whether a highest ranked point of interest was identified, respectively.

Steps 530 through 560 illustrate one embodiment for presenting location information to users that may be distracted and, as can be seen, each of steps 530 through 560 is based on a the existence of a particular combination of either an intersection, a point of interest, or both. However, alternative embodiments, not specifically illustrated in FIG. 6, are likewise contemplated. In particular, the steps 530 through 560 are based on empirical evidence of user comprehension and retention in distracting environments. Should further empirical evidence suggest different combinations of information, such combinations could be substituted for the information enumerated by steps 530 through 560 without departing from the scope of the present descriptions.

In the illustrated example of FIG. 6, if steps 520 and 525 determine that both an intersection and a point of interest have been identified to aid the user in describing the location of the address, then at step 530, a user presentation can be created comprising both the intersection and the point of interest. For example, returning to the sample map 99 of FIG. 1, if the input address had been 1422 Main Street, the intersection of Main and Elm streets could have been identified at step 390 and the water tower 70 could have been identified at step 490. Consequently, the user presentation created at step 530 could comprise an indication to the user that the desired location is "at the intersection of Main and Elm streets, near the water tower."

In one embodiment, a location can be identified to a user as being "at" an intersection even if the location is one or two buildings removed from the intersection. In particular, because the destination is often known in some form to the user, the presentation of the location need not have the same precision as an exact street number address. For example, if the user had inquired about a nearby gas station, and had received an instruction to go to the intersection of Main and Elm streets, the user would, upon approaching that intersection, see the gas station, even if it was technically located at 1432 Main Street. As the user had inquired about a gas station, the user would understand that the guidance provided was to the gas station at 1432 Main Street even if that gas station is not technically at the identified intersection itself.

In an alternative embodiment, the presentation of a nearby intersection can be accompanied with additional information, such as an indication that the location of the address is between two intersections, or that it is "halfway down the block" from the identified intersection. Thus, while step 530 indicates the preparation of a user presentation based exclusively on an intersection and a point of interest, the user presentation of step 530 could also comprise additional descriptive or directional information.

If steps 520 and 525 determine that, while an intersection was identified that is relevant to the address of step 510, no point of interest was identified, then, at step 520, a user presentation can be created at step 540 that comprises an indication of the identified intersection. Again, as described, additional information can also be included in the user presentation prepared at step 540, such as the address itself, or further descriptive or directional information.

If steps 520 and 525 instead determine that a point of interest was identified, but there is no appropriate intersection, then, at step 550, a user presentation can be created that references the point of interest and the address provided at step 510. Because a point of interest may not be a sufficiently precise indicator of a location, the address can be provided to the user as part of the user presentation of step 550. The addition of the point of interest can, nevertheless, be helpful to provide context to the user and enable the user to remember at least the approximate area of the address.

If neither an intersection nor a point of interest can be identified at steps 390 and 490, then steps 520 and 525 will determine that neither have been provided at step 510 and, at step 560, a user presentation based only on the address, or on the address and other descriptive information, aside from a relevant intersection or point of interest, can be prepared.

Once a user presentation has been created at one of steps 530, 540, 550 or 560, it can be normalized at step 570 for presentation to the user. In one embodiment, the user presentation can be delivered through the user via aural input, such as by a speaker or other speech generator. In such a case, the information being presented can be normalized to sound more natural and more meaningful to the user. For example, common abbreviations can be expanded into full words as they would normally be spoken. Similarly, numbers can be converted into words in accordance with the manner in which they would be spoken.

In one embodiment, the normalization performed at step 570 can be context-specific. For example, the abbreviation "st." generally represents the word "street" when used as part of an address, but can represent the word "saint" when used as part of the name of a point of interest. Thus, "main st." would be normalized to "main street" while "the cathedral of St. John" would be normalized to "the cathedral of Saint John." Similarly, the abbreviation "dr." generally represents the word "drive" when used as part of an address, but can represent the word "doctor" when used as part of the name of a point of interest.

Numbers can likewise be normalized based on context. For example, as a street number, the number 123 would be normalized as "one, two, three," while as part of a street name it might be normalized to "one twenty-three" if referring to Highway 123, or "one hundred twenty-third" if referring to 123$^{rd}$ Street. Normalizations can also be performed at step 570 for user delivery mechanisms other than speech. For example, if the user presentation was to be delivered via text message on a cellular telephone, rather than removing and expanding abbreviations, further abbreviations could be added. Thus, an intersection could be replaced by a listing of two street names with a "+" between them.

Once the user presentation has been normalized at step 570, it can be delivered to the user at step 580. As indicated, such a delivery need not be limited to a particular mechanism, such as a voice delivery, though some mechanisms may be better suited for the environment in which the user is currently operating. For example, if the user is driving a car, then voice delivery may be most convenient, as it does not require the user's visual attention. Similarly, if the user is in a loud area, but is not engaged in an activity that requires constant visual attention, then a textual presentation may be more appropriate.

In one embodiment, the performance of the above described mechanisms can occur on the same device as provides the presentation to the user at step 580. Thus, for example, the above described mechanisms could be implemented by a hand-held computing device designed for navigational functionality. In an alternative embodiment, however, the above described mechanisms can be performed by one or more computing devices located remotely from the user, and accessed via network communications, such as wireless networking communications or cellular communications. In such a case, the delivery of the normalized presentation to the user at step 580 can be performed by remote hardware, such as a speaker connected to a cellular telephone or other wirelessly connected hand-held computing device. Once the normalized presentation has been provided to the user at step 580, the mechanisms can end at step 590.

As can be seen from the above, mechanisms for providing location information to users that may be distracted have been described. In view of the many possible variations of the subject matter described herein, we claim as our invention all such embodiments as may come within the scope of the following claims and equivalents thereto.

We claim:

1. A computing device-implemented method for providing location information corresponding to an address to a user, the method comprising the steps of:
    selecting, based on the setting of the address, an area proximate to the address;
    identifying, with reference to an intersections database comprising intersection information extracted from one or more conventional map databases, intersections within the selected area;
    identifying, with reference to a points of interest database comprising points of interest information extracted from the one or more conventional map databases, points of interest within the selected area;
    ranking by a central processing unit of the computing device each street of the identified intersections according to a first set of criteria if more than one intersection was identified;
    ranking, by the central processing unit, the identified intersections, based on a summation of the ranking of each street that comprises the intersection, if more than one intersection was identified;
    ranking, by the central processing unit, the identified points of interest according to a second set of criteria if more than one point of interest was identified;
    filtering, by the central processing unit, the identified intersections prior to ranking the identified intersections to remove inappropriate intersections; and filtering the identified points of interest prior to ranking the identified points of interest to remove inappropriate points of interest;
    identifying a highest ranked intersection if any intersection was identified;
    identifying a highest ranked point of interest if any point of interest was identified;
    creating a user presentation of the location information corresponding to the address comprising the highest ranked intersection, if any, and the highest ranked point of interest, if any;
    normalizing the user presentation in accordance with an aural delivery mechanism, the normalizing comprising replacing abbreviations and numbers with their spoken equivalents based on context; and
    delivering the normalized user presentation with the aural delivery mechanism that is communicationally coupled to the computing device.

2. The method of claim 1, wherein the user presentation is created in accordance with a predetermined preference from among the highest ranked intersection, the highest ranked point of interest, and combinations thereof.

3. The method of claim 1, wherein the first set of criteria comprises criteria directed to a number of other intersections that include each street, individually, of each identified intersection.

4. The method of claim 1, wherein the first set of predetermined criteria comprises criteria directed to whether an identified intersection shares a street with the address.

5. The method of claim 1, wherein the second set of criteria is adjusted based on the user's expected familiarity with types of points of interest.

6. The method of claim 1, wherein inappropriate intersections comprise intersections identified as such because a single street changed names.

7. One or more computer-readable media comprising computer-executable instructions providing location information corresponding to an address to a user that may be distracted, the computer-executable instructions directed to steps comprising:
    selecting, based on the setting of the address, an area proximate to the address;
    identifying, with reference to an intersections database comprising intersection information extracted from one or more conventional map databases, intersections within the selected area;
    identifying, with reference to a points of interest database comprising points of interest information extracted from the one or more conventional map databases, points of interest within the selected area;
    ranking each street of the identified intersections according to a first set of criteria if more than one intersection was identified;
    ranking the identified intersections, based on a summation of the ranking of each street that comprises the intersection, if more than one intersection was identified;
    ranking the identified points of interest according to a second set of criteria if more than one point of interest was identified;
    filtering the identified intersections prior to ranking the identified intersections to remove inappropriate intersections; and filtering the identified points of interest prior to ranking the identified points of interest to remove inappropriate points of interest;

identifying a highest ranked intersection if any intersection was identified;

identifying a highest ranked point of interest if any point of interest was identified;

creating a user presentation of the location information corresponding to the address comprising the highest ranked intersection, if any, and the highest ranked point of interest, if any;

normalizing the user presentation in accordance with an aural delivery mechanism, the normalizing comprising replacing abbreviations and numbers with their spoken equivalents based on context; and delivering the normalized user presentation with the aural delivery mechanism.

8. The computer-readable media of claim 7 comprising further computer-executable instructions directed to one or more conventional map database to derive an addresses database correlating addresses to their location in a coordinate system, the intersections database correlating intersections to their location in the coordinate system, and the points of interest database correlating points of interest to their location in the coordinate system; wherein the identifying intersections within the selected area and the identifying points of interest within the selected area are performed with reference to the addresses database, the intersections database, and the points of interest database.

9. The computer-readable media of claim 8, wherein the points of interest database comprises user-entered points of interest.

10. The computer-readable media of claim 7, wherein the user presentation is created in accordance with a predetermined preference from among the highest ranked intersection, the highest ranked point of interest, and combinations thereof.

11. The computer-readable media of claim 7, wherein the first set of criteria comprises criteria directed to a number of other intersections that include each street, individually, of each identified intersection.

12. The computer-readable media of claim 7, wherein the second set of criteria is adjusted based on the user's expected familiarity with types of points of interest.

13. A system for providing location information corresponding to an address to a user, the system comprising: an intersections database comprising intersection information extracted from one or more conventional map database; a points of interest database comprising points of interest information extracted from the one or more conventional map database;

a processing unit performing steps comprising: selecting, based on the setting of the address, an area proximate to the address; identifying, with reference to the intersection database, intersections within the selected area; identifying, with reference to the points of interest database, points of interest within the selected area; ranking each street of the identified intersections according to a first set of criteria if more than one intersection was identified; ranking the identified intersections, based on a summation of the ranking of each street that comprises the intersection, if more than one intersection was identified; ranking the identified points of interest according to a second set of criteria if more than one point of interest was identified; filtering the identified intersections prior to ranking the identified intersections to remove inappropriate intersections; filtering the identified points of interest prior to ranking the identified points of interest to remove inappropriate points of interest; identifying a highest ranked intersection if any intersection was identified; identifying a highest ranked point of interest if any point of interest was identified; creating a user presentation of the location information corresponding to the address comprising the highest ranked intersection, if any, and the highest ranked point of interest, if any; and normalizing the user presentation in accordance with an aural user output device, the normalizing comprising replacing abbreviations and numbers with their spoken equivalents based on context; and the aural user output device delivering the normalized user presentation to the user.

14. The system of claim 13, wherein the processing unit is co-located with the user output device.

15. The system of claim 13, wherein the processing unit is remotely located from the user output device and communicates wirelessly with the user output device.

16. The system of claim 13, wherein the second set of criteria is adjusted based on the user's expected familiarity with types of points of interest.

* * * * *